United States Patent
Khailany et al.

(10) Patent No.: US 9,164,690 B2
(45) Date of Patent: Oct. 20, 2015

(54) SYSTEM, METHOD, AND COMPUTER PROGRAM PRODUCT FOR COPYING DATA BETWEEN MEMORY LOCATIONS

(75) Inventors: Brucek Kurdo Khailany, San Francisco, CA (US); Sean Jeffrey Treichler, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 330 days.

(21) Appl. No.: 13/560,315

(22) Filed: Jul. 27, 2012

(65) Prior Publication Data

US 2014/0032828 A1    Jan. 30, 2014

(51) Int. Cl.
  *G06F 12/02*    (2006.01)
  *G06F 3/06*    (2006.01)
  *G06F 9/30*    (2006.01)

(52) U.S. Cl.
  CPC .............. *G06F 3/065* (2013.01); *G06F 9/3004* (2013.01)

(58) Field of Classification Search
  CPC .............................. G06F 3/065; G06F 9/3004
  USPC ............ 711/105, 104, 147, 165, 162; 712/14, 712/214
  See application file for complete search history.

(56) References Cited

U.S. PATENT DOCUMENTS

| | | | |
|---|---|---|---|
| 5,974,538 A * | 10/1999 | Wilmot, II | 712/218 |
| 6,502,170 B2 * | 12/2002 | Zahir | 711/141 |
| 6,647,456 B1 * | 11/2003 | Van Dyke et al. | 711/105 |
| 6,665,783 B2 * | 12/2003 | Zahir | 711/165 |
| 6,708,256 B2 * | 3/2004 | Zahir | 711/141 |
| 6,957,298 B1 * | 10/2005 | Van Dyke et al. | 711/105 |
| 7,111,125 B2 * | 9/2006 | Hooker | 711/137 |
| 7,490,218 B2 * | 2/2009 | Eggers et al. | 712/25 |
| 7,567,963 B2 * | 7/2009 | Shpeisman et al. | 1/1 |
| 7,584,321 B1 * | 9/2009 | Malachowsky et al. | 711/5 |
| 8,266,607 B2 * | 9/2012 | Burka et al. | 717/154 |
| 8,381,203 B1 * | 2/2013 | Beylin et al. | 717/150 |
| 8,570,322 B2 * | 10/2013 | Hanika et al. | 345/421 |
| 8,595,701 B2 * | 11/2013 | Li et al. | 717/124 |
| 8,599,841 B1 * | 12/2013 | Sriram | 370/389 |
| 2003/0135535 A1 * | 7/2003 | Hoeflinger et al. | 709/102 |
| 2008/0040560 A1 * | 2/2008 | Hall et al. | 711/152 |
| 2012/0204154 A1 * | 8/2012 | Li et al. | 717/124 |
| 2013/0166879 A1 * | 6/2013 | Sun et al. | 712/30 |
| 2014/0013083 A1 * | 1/2014 | Jha | 712/205 |
| 2014/0164733 A1 * | 6/2014 | Jha | 712/4 |

OTHER PUBLICATIONS

Gschwind, M. et al., "Synergistic Processing in Cell's Multicore Architecture," IEEE Micro, 2006, pp. 10-24.
Rixner, S. et al., "A Bandwidth-Efficient Architecture for Media Processing," Appears in Micro-31, 1998, pp. 1-11.
Khailany, B. et al., "Imagine: Media Processing with Streams," IEEE Micro, 2001, pp. 35-46.

(Continued)

*Primary Examiner* — Stephen Elmore
(74) *Attorney, Agent, or Firm* — Zilka-Kotab, PC (57) ABSTRACT

A system, method, and computer program product are provided for copying data between memory locations. In use, a memory copy instruction is implemented. Additionally, data is copied from a first memory location to a second memory location, utilizing the memory copy instruction.

21 Claims, 4 Drawing Sheets

(56) References Cited

OTHER PUBLICATIONS

Mantor, M. et al., "AMD Graphic Core Next," AMD Fusion Developer Summit, Jun. 2011, 45 slides.

Chen, T. et al., "Cell Broadband Engine Architecture and its first implementation: A performance view" IBM, Nov. 29, 2005, retrieved from http://www.ibm.com/developerworks/power/library/pa-cellperf/, pp. 1-31.

* cited by examiner

SYSTEM, METHOD, AND COMPUTER PROGRAM PRODUCT FOR COPYING DATA BETWEEN MEMORY LOCATIONS

This invention was made with Government support under Agreement No. HR0011-10-9-0008, awarded by DARPA. The Government has certain rights in the invention.

FIELD OF THE INVENTION

The present invention relates to memory management, and more particularly to copying data from a first memory location to a second memory location.

BACKGROUND

Data is commonly transferred between memory locations in order to be processed by a processor. For example, data may be copied from dynamic random access memory (DRAM) to local or shared memory for processing during a streaming application. However, current techniques for copying data between memory locations have been associated with various limitations.

For example, data may be first copied from external memory to a register file, where it is then transferred to local scratchpad memory within a processor. This may result in a limited number of outstanding data transfers, bottlenecking, wasted power, etc. There is thus a need for addressing these and/or other issues associated with the prior art.

SUMMARY

A system, method, and computer program product are provided for copying data between memory locations. In use, a memory copy instruction is implemented. Additionally, data is copied from a first memory location to a second memory location, utilizing the memory copy instruction.

DETAILED DESCRIPTION

Figure 1:
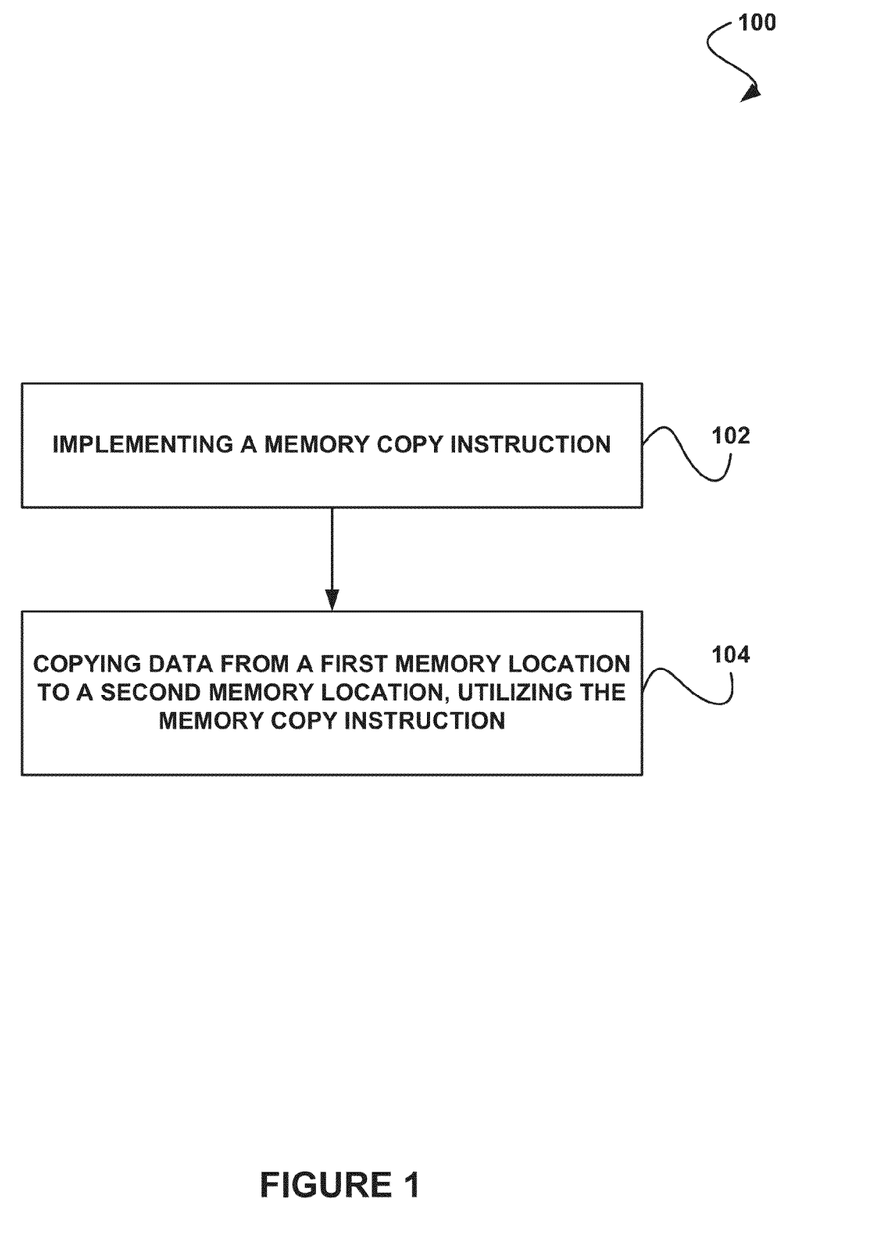
FIG. 1 shows a method for copying data between memory locations, in accordance with one embodiment.

FIG. 1 shows a method 100 for copying data between memory locations, in accordance with one embodiment. As shown in operation 102, a memory copy instruction is implemented. In one embodiment, the memory copy instruction may include a hardware instruction. For example, the memory copy instruction may include an instruction that is read and implemented by a processor (e.g., a streaming multiprocessor, a multi-core processor, a graphics processing unit (GPU), a central processing unit (CPU), etc.) of a computing device. In another embodiment, the memory copy instruction may be implemented using an instruction set architecture (ISA). For example, the memory copy instruction may be implemented using machine language or assembly language.

Additionally, in one embodiment, the memory copy instruction may be issued by a thread. For example, the memory copy instruction may be issued by a thread of a parallel thread array. In another embodiment, the memory copy instruction may include an instruction for copying data from one memory location to another memory location. In another embodiment, the memory copy instruction may include one or more operands associated with the copying of data.

For example, the memory copy instruction may include an operand that specifies a destination address in a memory location (e.g., an address in a memory location where data is to be deposited, etc.). In another example, the memory copy instruction may include an operand that specifies a source address in a memory location (e.g., an address in a memory location where data is to be retrieved, etc.). In yet another example, the memory copy instruction may include an operand indicating a size of data to be transferred from the source address to the destination address.

Further, as shown in operation 104, data is copied from a first memory location to a second memory location, utilizing the memory copy instruction. In one embodiment, the data may be copied in accordance with the one or more operands included within the memory copy instruction. For example, the first memory location may be indicated by the operand within the memory copy instruction that specifies a source address in a memory location. In another example, the second memory location may be indicated by the operand within the memory copy instruction that specifies a destination address in a memory location. In still another example, an amount of data copied from the first memory location to the second memory location may be determined based on an operand within the memory copy instruction indicating a size of data to be transferred.

Further still, in one embodiment, the data may be copied from the first memory location to the second memory location, utilizing a processor. For example, a processor may read the memory copy instruction and may perform the copying of the data (e.g., by performing one or more actions, etc.) according to the memory copy instruction. In another embodiment, the data may be copied from the first memory location to the second memory location, utilizing a thread. For example, a plurality of threads may have the capability of being scheduled, and a single thread of the plurality of threads may instruct a processor to copy the data according to the memory copy instruction.

Also, in one embodiment, the first and/or the second memory location may include a location in external memory (e.g., global memory, etc.). For example, the external memory may include dynamic random access memory (DRAM), etc. In another embodiment, the first and/or the second memory location may include a location in local memory (e.g., on-chip processor memory, shared memory, etc.). For example, the local memory may include static random access memory (SRAM), etc.

In addition, in one embodiment, data may be copied from a plurality of locations in the first memory to a plurality of locations in the second memory, utilizing a plurality of memory copy instructions. In another embodiment, the plurality of memory copy instructions may be executed in parallel. For example, a processor may be associated with a parallel thread array including a plurality of parallel threads, and each of a plurality of threads in the parallel thread array may implement an independent memory copy instruction (e.g., by indicating the memory copy instruction and copying data according to the memory copy instruction, etc.) in parallel.

Furthermore, in one embodiment, copying the data from the first memory location to the second memory location may include copying a sequential portion of data. For example, one of a plurality of sequential portions of data may be copied from the first memory location to the second memory location, and the first memory location, the second memory location, and the size of the portion of data may be specified by the memory copy instruction.

Further still, in one embodiment, a mask bitfield may be supported during the copying of the data from the first memory location to the second memory location. For example, in addition to the first memory location and the second memory location, a mask bitfield may be specified by the memory copy instruction. Additionally, each byte within a sequential portion of data may be conditionally copied from the first memory location to the second memory location based on bits within the mask bitfield.

Also, in one embodiment, strided access patterns may be supported during the copying of the data from the first memory location to the second memory location. For example, in addition to the first memory location and the second memory location, an element count, an element size, and an element stride may be specified by the memory copy instruction. Additionally, a portion of data matching the element count, size, and stride may be copied from the first memory location to the second memory location in accordance with the memory copy instruction.

Additionally, in one embodiment, race conditions may be avoided during the copying of the data from the first memory location to the second memory location. For example, named barriers may be used to enable thread arrays to synchronize with the completion of previously executed memory copy instructions. For instance, a barrier group identifier may be passed to the memory copy instruction and named barrier instructions executed at a later time in the thread array may wait for the memory copy instruction to complete before allowing thread execution to continue.

In another embodiment, race conditions may be avoided during the copying of the data from the first memory location to the second memory location by utilizing a memory fence instruction. For example, a synchronization identifier may be passed to the memory copy instruction, and the memory fence instruction may be executed after the memory copy instruction. Additionally, the memory fence instruction may cause an executing thread to wait for all prior data transfers with an identifier matching that of the memory fence instruction that were requested by the executing thread to be performed before proceeding with processing of the data. In this way, data processing may not commence until all pertinent data copying has been completed.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
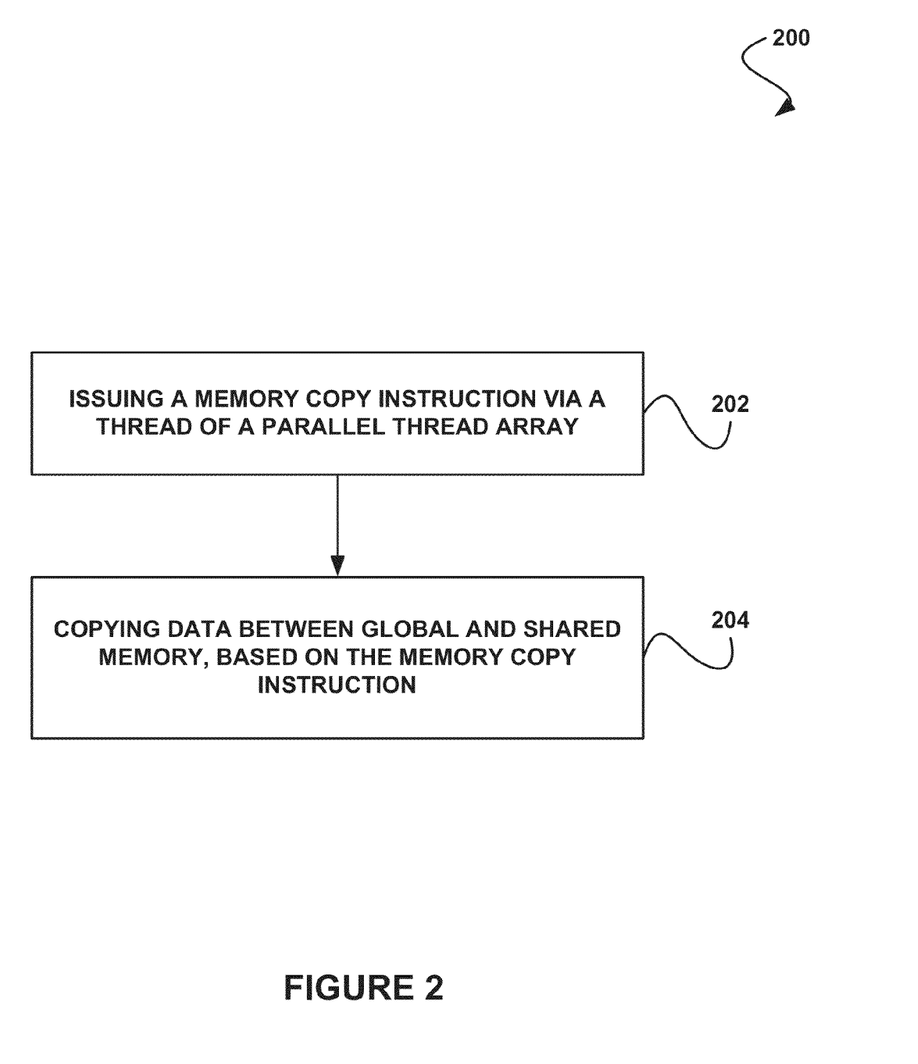
FIG. 2 shows a method for copying data from global to shared memory, in accordance with another embodiment.

FIG. 2 shows a method 200 for copying data from global to shared memory, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a memory copy instruction is issued via a thread of a parallel thread array. In one embodiment, the thread may be included within a parallel thread array (e.g., a coherent thread array in a streaming multiprocessor or GPU, etc.). In another embodiment, a plurality of independent memory copy instructions may each be issued in a parallel manner via a separate thread of a parallel thread array.

Additionally, in one embodiment, the memory copy instruction may include a plurality of operands. Table 1 illustrates an exemplary specification for the memory copy instruction, in accordance with one embodiment. Of course, it should be noted that the exemplary specification shown in Table 1 is set forth for illustrative purposes only, and thus should not be construed as limiting in any manner.

TABLE 1

MEMCPY [Rdst + Imm], [Rsrc + Imm], ID, Size

In one embodiment, the "Rdst" operand of the memory copy instruction may specify a destination address. For example, the "Rdst" operand may specify a destination address for data to be copied. In another embodiment, the "Rsrc" operand may specify a source address. For example, the "Rsrc" operand may specify a source address from which data to be copied is obtained. In yet another embodiment, the "Imm" operand may signify an offset associated with an address (e.g., an immediate offset, etc.).

In still another embodiment, the "ID operand" may specify an identifier (e.g., an identifier that may be used for synchronization, etc.). In another embodiment, the "Size" operand may specify a size. For example, the "Size" operand may specify a size of the portion of data to be copied from a source to a destination. In this way, the memory copy instruction may cause a sequential portion of data with a size specified in bytes to be copied from the source to the destination address.

Further, as shown in operation 204, data is copied between global and shared memory, based on the memory copy instruction. In one embodiment, the destination address of the memory copy instruction may indicate a global memory address, and the source address of the memory copy instruction may indicate a shared memory address, such that the data is copied from the shared memory address to the global memory address. In another embodiment, the destination address of the memory copy instruction may indicate a shared memory address, and the source address of the memory copy instruction may indicate a global memory address, such that the data is copied from the global memory address to the shared memory address.

Further still, in one embodiment, with single instruction multiple threads (SIMT) execution, in order to do a transfer of kilobytes of data with complex access patterns, parallel threads in a thread array may each execute a memory copy instruction, typically all with the same ID, but with different destination addresses, source addresses, and sometimes with different sizes. For example, different sizes may be used for mapping data access patterns where the size of the transfer is not particularly well-matched to the number of threads in a thread array. In another embodiment, a size of zero may indicate that a particular thread should not cause any data to be transferred.

Also, in one embodiment, the memory copy instruction may support a mask bitfield. Table 2 illustrates an exemplary specification for a memory copy instruction that supports a mask bitfield on fixed-size data transfers, in accordance with one embodiment. Of course, it should be noted that the exemplary specification shown in Table 2 is set forth for illustrative purposes only, and thus should not be construed as limiting in any manner.

TABLE 2

MEMCPY [Rdst + Imm], [Rsrc + Imm], ID, Mask

In one embodiment, a "Mask" operand may be provided instead of a "Size" operand. In another embodiment, a size of the data transfer may be fixed. For example, the size of the data transfer may be based on a width of the "Mask" operand. In yet another embodiment, each byte in a sequential portion of data may be conditionally copied based on bits within the "Mask" bitfield. In still another embodiment, with scatter/gather support, data may be compacted when copied to the destination address.

In addition, in one embodiment, the memory copy instruction may support strided access patterns. Table 3 illustrates an exemplary specification for a memory copy instruction that supports strided access patterns, in accordance with one embodiment. Of course, it should be noted that the exemplary specification shown in Table 3 is set forth for illustrative purposes only, and thus should not be construed as limiting in any manner.

TABLE 3

MEMCPY [Rdst + Imm], [Rsrc + Imm], ID, ElCnt, ElSize, ElStride

In one embodiment, the "ElCnt" operand of the memory copy instruction may specify a configurable element count. Additionally, the "ElSize" operand of the memory copy instruction may specify a configurable element size. Further, the "ElStride" operand of the memory copy instruction may specify a configurable element stride. In another embodiment, with parallel threads in a thread array, this may allow for a reduced number of total MEMCPY instructions to execute complex access patterns. For example, if it is desired to copy a 64×64 matrix of elements from external memory to shared memory, the strided MEMCPY may only require one instruction if an ElCnt of 64 is supported (instead of issuing 64 thread instructions).

Figure 3:
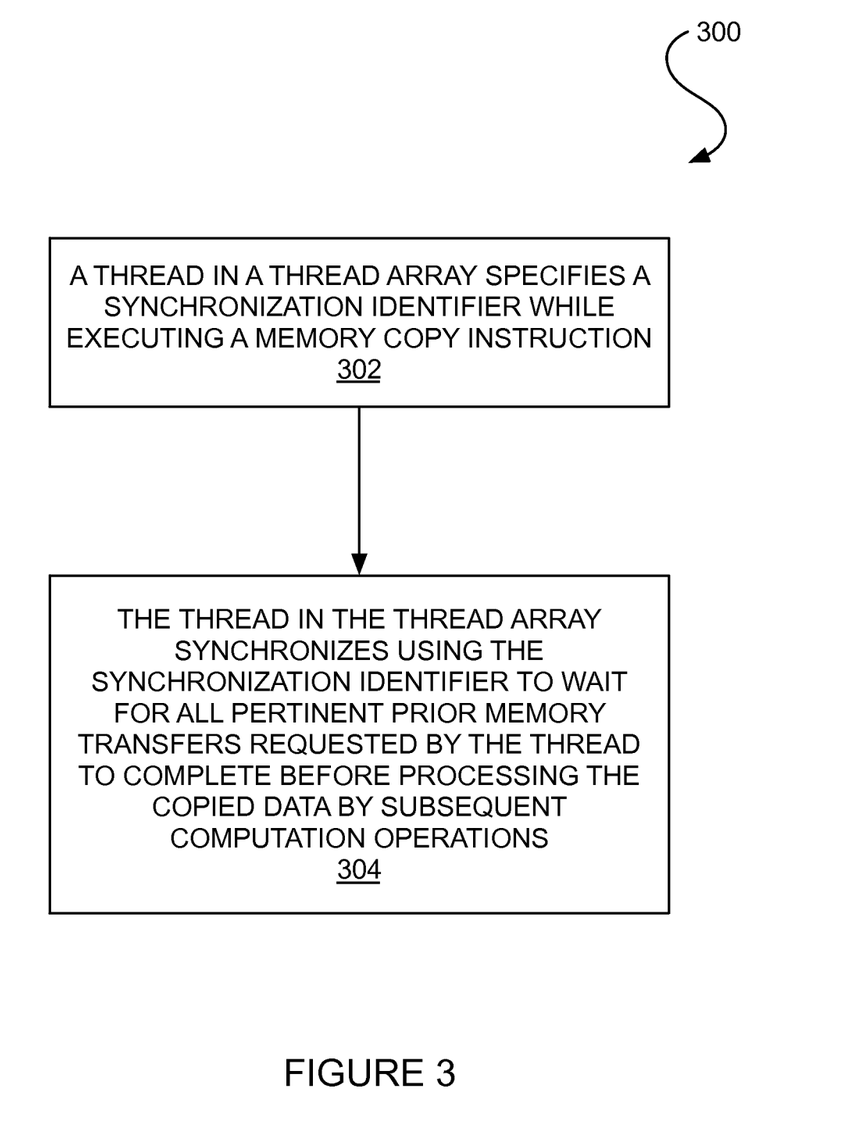
FIG. 3 shows a method for avoiding race conditions while copying data, in accordance with another embodiment.

FIG. 3 shows a method 300 for avoiding race conditions while copying data, in accordance with another embodiment. As an option, the method 300 may be carried out in the context of the functionality of FIGS. 1-2. Of course, however, the method 300 may be implemented in any desired environment. It should also be noted that the aforementioned definitions may apply during the present description.

As shown in operation 302, a thread in a thread array specifies a synchronization identifier while executing a memory copy instruction. In one embodiment, the synchronization identifier may be included within the memory copy instruction. In another embodiment, the synchronization identifier may support synchronization via a memory fence instruction. Table 4 illustrates an exemplary memory fence instruction, in accordance with one embodiment. Of course, it should be noted that the exemplary memory fence instruction shown in Table 4 is set forth for illustrative purposes only, and thus should not be construed as limiting in any manner.

TABLE 4

MEMBAR.ID ID

In one embodiment, the memory fence instruction "MEMBAR.ID" may include a single operand ("ID") that may be used for synchronization purposes. For example, the "ID" operand may also be passed to the memory copy instruction (e.g., as the "ID" operand of the memory copy instruction, etc.). In another embodiment, different threads within a parallel thread array may issue independent memory fence instructions in parallel.

Additionally, as shown in operation 304, the thread in the thread array synchronizes using the synchronization identifier to wait for all pertinent prior memory transfers requested by the thread to complete before processing the copied data by subsequent computation operations. For example, the thread may wait for all prior memory transfers with an "ID" operand matching the "ID" operand in the memory copy instruction to complete before proceeding with a computation operation. In this way, processing of data may not proceed until the copying of the data is completed, such that a memory fence instruction may be applied to all outstanding memory copies with a predetermined ID issued from a thread array.

Further, in one embodiment, the MEMBAR.ID instruction may provide software flexibility for synchronization since one MEMBAR.ID can synchronize with multiple MEMCPY instructions (even if the MEMCPY instructions complete out of order). The MEMBAR.ID instruction may also allow for lighter-weight more-flexible synchronization since such instruction may not require all threads in a thread array to arrive at a barrier before proceeding, which may thereby enable parallel independent work to be performed in certain use cases.

Further still, in one embodiment, named barriers may be used to avoid race conditions. For example, a named barrier such as BAR.SYNC with barrier group IDs may be used, where a barrier group ID may be passed to the memory copy instruction and BAR.SYNC instructions executed later in the thread array may wait for the memory copy instruction to complete before allowing thread execution to continue. This may avoid race conditions between the copying of data to shared memory and computation which uses that data by enabling thread arrays to synchronize with the completion of previously-executed memory copy instructions.

Also, in one embodiment, the completion of MEMCPY instructions may be signaled through an existing named barrier mechanism (e.g., BAR.SYNC, etc.). For example, the memory copy instruction may be given the name of a barrier, and once the memory copy instruction has completed, the equivalent of a BAR.ARV on that barrier may be performed. In another embodiment, any threads that wish to wait on the completion of one or more memory copy instructions (regardless of which thread issued them) may perform a BAR.SYNC, which may specify the number of memory copy instructions that were issued with that barrier ID (e.g., the number of additional barrier arrivals expected, etc.). In yet another embodiment, threads that don't need to wait for the memory copy instructions to complete (even if they helped to issue some of them) may not participate in the BAR.SYNC and may continue execution without unnecessary stalling.

In addition, in one embodiment, streaming applications may make use of memory fence instructions in different ways, depending on workload characteristics. For example, streaming applications may be written by setting up a buffer in shared memory and may be run with multiple thread arrays per streaming multiprocessor for maximum concurrency. In this way, every thread in a thread array may issue a sequence of non-blocking data transfers using memory copy instructions to prefetch data to shared memory (e.g., the "next" buffer, etc.) while performing computation on the current buffer. In another embodiment, once the computation completes, a barrier may be used for synchronization.

Furthermore, in one embodiment, two buffers may be set up per thread array and double buffering may be used to achieve maximum concurrency. This approach may increase an efficiency of register usage. Further still, with this usage pattern, the efficient lightweight synchronization provided by MEMBAR.ID combined with producer/consumer synchronization instructions may result in increased synchronization speed. Also, the above usage patterns may also be combined with thread specialization. For example, with thread specialization, a single thread array may be split into "DMA threads" and "compute threads." In another example, DMA threads may be responsible for executing the data transfers to shared memory while compute threads may be responsible for processing the data in shared memory.

In this way, the above memory copy instructions may retain the same semantics as a load concatenated with a store to the compiler, which may make the copy instructions an easy compilation target. Additionally, the above memory copy instructions may apply to arbitrary application domains with new access patterns. Further, registers may not be used for staging purposes during data transfers between memory locations, which may result in a greater amount of available registers. Further still, power overhead/dissipation may be reduced.

Also, streaming multi-processors (SMs) (e.g., those used in GPUs or other throughput-optimized processing cores), may use the above memory copy instructions and memory fence instructions to copy batches (e.g., kilobytes, etc.) of data from external memory (e.g., DRAM, etc.) to on-chip local memory (e.g., local SRAMs, etc.). These copies may enable streaming applications, where computation may loop over a dataset that is too large to fit in on-chip memory by processing a sub-block of that dataset during each loop iteration. For example, a matrix-vector multiply may load a long vector into shared memory in multiple stages or loop iterations. For each stage, data may be first copied from DRAM into shared memory and then may be processed. This may be repeated multiple times in order to compute each output value.

Figure 4:
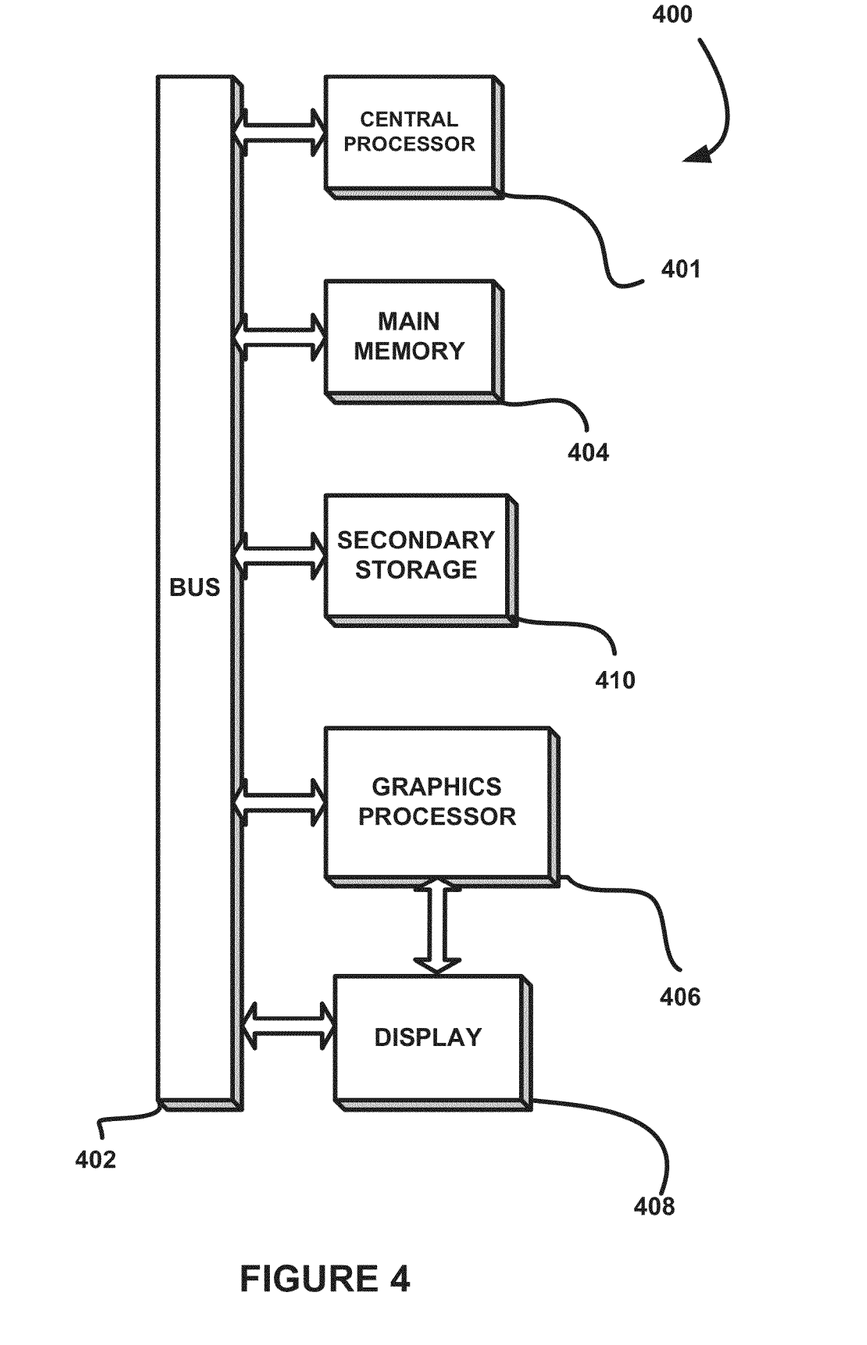
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor associated with a parallel thread array including a plurality of parallel threads, a memory copy instruction configured to copy data for a first thread of the plurality of parallel threads from a first memory to a second memory;
determining, by the processor, that the first thread specifies a synchronization identifier corresponding to the memory copy instruction; and
processing the data by the processor after waiting for all memory transfers requested by the first thread to complete.

2. The method of claim 1, wherein the memory copy instruction includes an operand that specifies a destination address in the second memory, an operand that specifies a source address in the first memory, and an operand indicating a size of the data to be transferred from the source address to the destination address.

3. The method of claim 1, wherein an amount of the data copied from the first memory to the second memory is determined based on an operand within the memory copy instruction indicating a size of the data to be transferred.

4. The method of claim 1, wherein the synchronization identifier is included within the memory copy instruction.

5. The method of claim 1, further comprising, receiving, by the processor, a memory fence instruction that includes the synchronization identifier.

6. The method of claim 1, further comprising, before the processing, determining that a second synchronization identifier included in a memory fence instruction matches the synchronization identifier specified by the first thread.

7. The method of claim 1, further comprising:
receiving, by the processor, a second memory copy instruction configured to copy second data for a second thread of the plurality of parallel threads from the first memory to the second memory;
determining, by the processor, that the second thread does not specify the synchronization identifier; and
processing the second data by the processor without waiting for all memory transfers requested by the second thread to complete.

8. The method of claim 1, further comprising:
receiving, by the processor, a second memory copy instruction configured to copy second data for a second thread of the plurality of parallel threads from the first memory to the second memory;
determining, by the processor, that the second thread specifies the synchronization identifier corresponding to the memory copy instruction; and
processing the second data by the processor after waiting for all memory transfers requested by the second thread and the first thread to complete.

9. The method of claim 1, wherein the synchronization identifier is a barrier group identifier indicating that the first thread participates in the barrier group, and further comprising, before the determining, receiving a barrier instruction corresponding to the barrier group identifier.

10. The method of claim 1, wherein the memory copy instruction includes a size that specifies a size of the data that is copied from the first memory to the second memory and copying none of the data when the size specified by the memory copy instruction is zero.

11. The method of claim 1, wherein the memory copy instruction includes a mask bitfield that specifies which bytes within the data are copied from the first memory to the second memory.

12. A system comprising:
a first memory;
a second memory; and
a processor associated with a parallel thread array including a plurality of parallel threads and configured to:
receive a memory copy instruction configured to copy data for a first thread of the plurality of parallel threads from the first memory to the second memory;
determine that the first thread specifies a synchronization identifier corresponding to the memory copy instruction; and
process the data after waiting for all memory transfers requested by the first thread to complete.

13. The system of claim 12, wherein the memory copy instruction includes an operand that specifies a destination address in the second memory, an operand that specifies a source address in the first memory, and an operand indicating a size of the data to be transferred from the source address to the destination address.

14. The system of claim 12, wherein an amount of the data copied from the first memory to the second memory is determined based on an operand within the memory copy instruction indicating a size of the data to be transferred.

15. The system of claim 12, wherein the synchronization identifier is included within the memory copy instruction.

16. The system of claim 12, wherein the processor receives a memory fence instruction that includes the synchronization identifier.

17. The system of claim 12, wherein the processor is further configured to determine that a second synchronization identifier included in a memory fence instruction matches the synchronization identifier specified by the first thread before processing the data.

18. The system of claim 12, wherein the processor is further configured to:
receive a second memory copy instruction configured to copy second data for a second thread of the plurality of parallel threads from the first memory to the second memory;
determine that the second thread does not specify the synchronization identifier; and
process the second data without waiting for all memory transfers requested by the second thread to complete.

19. The system of claim 12, wherein the processor is further configured to:
receive a second memory copy instruction configured to copy second data for a second thread of the plurality of parallel threads from the first memory to the second memory;
determine that the second thread does specify the synchronization identifier corresponding to the memory copy instruction; and
process the second data by the processor after waiting for all memory transfers requested by the second thread and the first thread to complete.

20. The system of claim 12, wherein the synchronization identifier is a barrier group identifier indicating that the first thread participates in the barrier group, and further comprising, before the determining, receiving a barrier instruction corresponding to the barrier group identifier.

21. A non-transitory computer-readable medium storing instructions that, when executed by a processor, causes the processor to perform steps comprising:
receiving a memory copy instruction configured to copy data for a first thread of a plurality of parallel threads from a first memory to a second memory, wherein the processor is associated with a parallel thread array including the plurality of parallel threads;
determining that the first thread specifies a synchronization identifier corresponding to the memory copy instruction; and
processing the data after waiting for all memory transfers requested by the first thread to complete.

* * * * *